Figure 1:
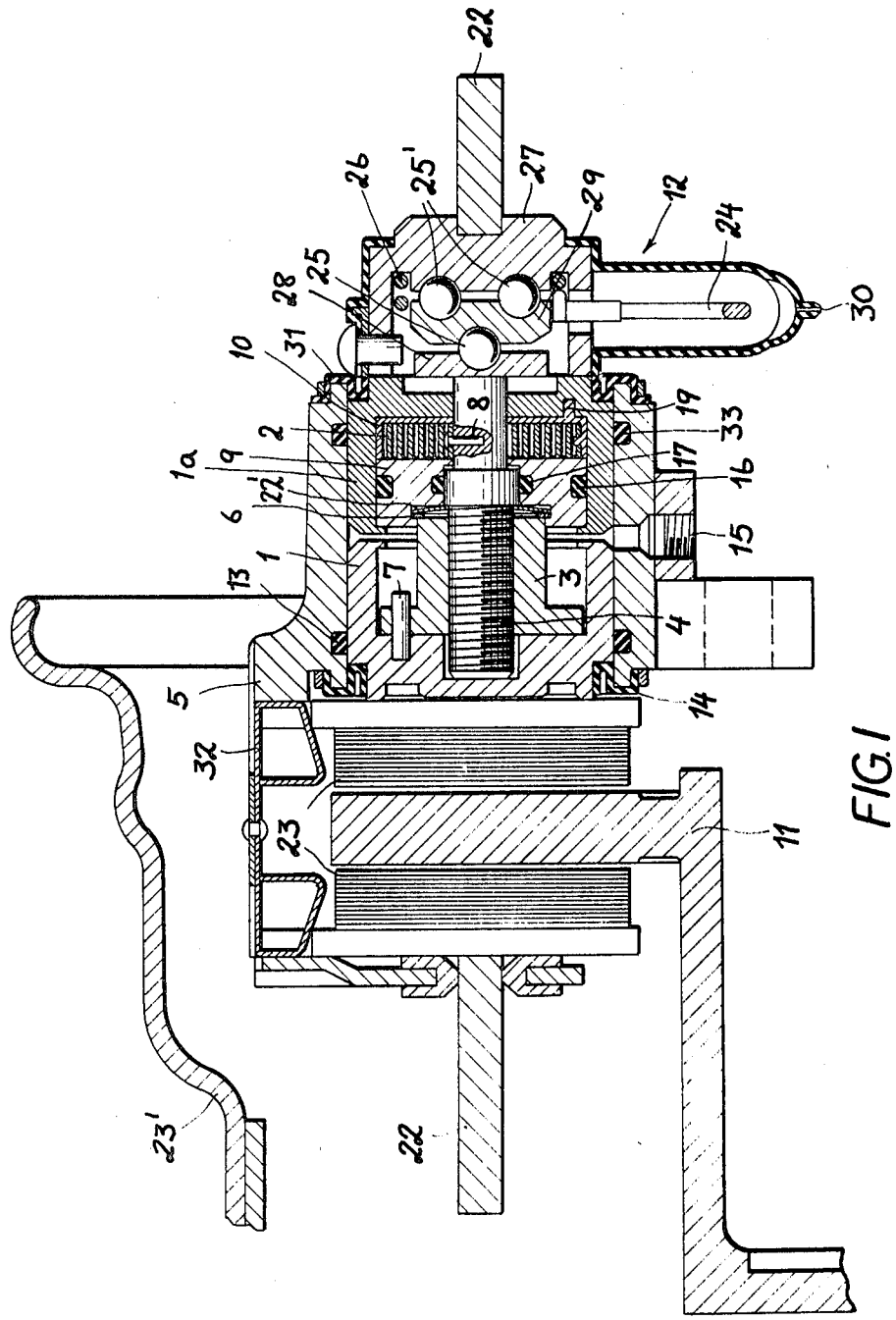

United States Patent

[11] 3,590,964

| [72] | Inventor | Gerhard Krause<br>Frankfurt am Main, Germany |
|---|---|---|
| [21] | Appl. No | 770,749 |
| [22] | Filed | Oct. 25, 1968 |
| [45] | Patented | July 6, 1971 |
| [73] | Assignee | Alfred Teves GmbH<br>Frankfurt am Main, Germany |
| [32] | Priority | Dec. 12, 1967 |
| [33] | | Germany |
| [31] | | T 35 459 |

[54] SPRING-LOADED ADJUSTMENT MECHANISM FOR HYDRAULIC DISC BRAKE
10 Claims, 2 Drawing Figs.

[52] U.S. Cl. ................................................. 188/196, 188/71.9, 188/106
[51] Int. Cl. ..................................................... F16d 65/56, F16d 55/18
[50] Field of Search ........................................... 188/72, 73, 79.5 GE, 196 F, 196 A, 106 F

[56] References Cited
UNITED STATES PATENTS
3,255,851  6/1966  Griesenbrock  .. 188/196 (F)

*Primary Examiner*—Duane A. Reger
*Attorney*—Karl F Ross

ABSTRACT: A spring-loaded adjustment mechanism for a hydraulic disc brake is provided with a threaded member acting upon the brake piston and rotatable to displace this piston and adjust the brake. A spiral spring engages this member and is prestressed so as to turn the member in the adjusting sense on increase of brake play beyond a predetermined limit to reset the original brake play be resetting the rest position of the piston. A blocking piston is clampingly engageable with the spring on actuation of the brake to immobilize it so that no rotation of the adjustment member is possible with the brake actuated.

SPRING-LOADED ADJUSTMENT MECHANISM FOR HYDRAULIC DISC BRAKE

My invention relates to a spring-loaded adjustment mechanism for a hydraulic disc brake.

Spring-loaded adjustment mechanisms are not unknown in the art. They generally have a spring-loaded adjustment member which, when the brake play is more than a predetermined limit, advances the rest position of the brake piston an increment toward the disc on actuation of the brake. The piston is moved forward one increment on each actuation until the desired brake play is reestablished.

Such mechanisms have two major disadvantages: First, they are liable to adjust the brake too much when it is applied and the brake housing or caliper is in a trained condition thereby overadjusting the brake. This can lead to dangerous an troublesome locking of the brake.

Second, the brake is generally adjusted in steps by a ratchet or crank arrangement so that if a great deal of adjustment is required it will take some few actuations of the brake to effect them. Until this multistep adjustment operation is fully carried out, the brake will not respond as desired since the brake play will not be at the correct level.

It is therefore an object of my invention to overcome these disadvantages.

A further object of the invention is to extend the principles disclosed in commonly assigned applications Ser. No. 700,515 filed 25 Jan. 1968 (now U.S. Pat. No. 3,498,423 ) and Ser. No. 655,150 filed 21 July 1967 (now U.S. Pat. No. 3,467,277) by Juan Belart and involving torsion-spring adjustment devices.

Another object of this invention is to provide a brake-adjustment system operative only upon deactivation of the brake to reset the rest position of the brakeshoes.

I do this by providing my adjustment mechanism with blocking means in the form of a blocking piston which renders force-storing means, in this case a spring which prestresses the adjustment member, ineffective during actuation of the brake. Furthermore, the brake-adjustment mechanism according to my invention carrying out the full adjustment operation in a single step.

This blocking piston, in accordance with a feature of my invention, is annular and surrounds the adjustment member or spindle tightly. On hydraulic pressurization of the brake, it slides along the adjustment member and clamps the spiral torsion spring, serving as force-storing means against the housing, to prevent it from turning the adjustment member.

According to a further feature of my invention, spring means is provided to urge the blocking piston away from the spiral spring when the brake is not actuated or pressurized. This spring means can be a dished-disc or washer-type spring engaged between the adjustment member and a snap ring inside the blocking piston to urge the latter away from the former. Alternatively of this, a compression spring urging the blocking piston away from the spiral spring and against a snap ring can be provided to urge the two out of contact with each other.

Figure 2:
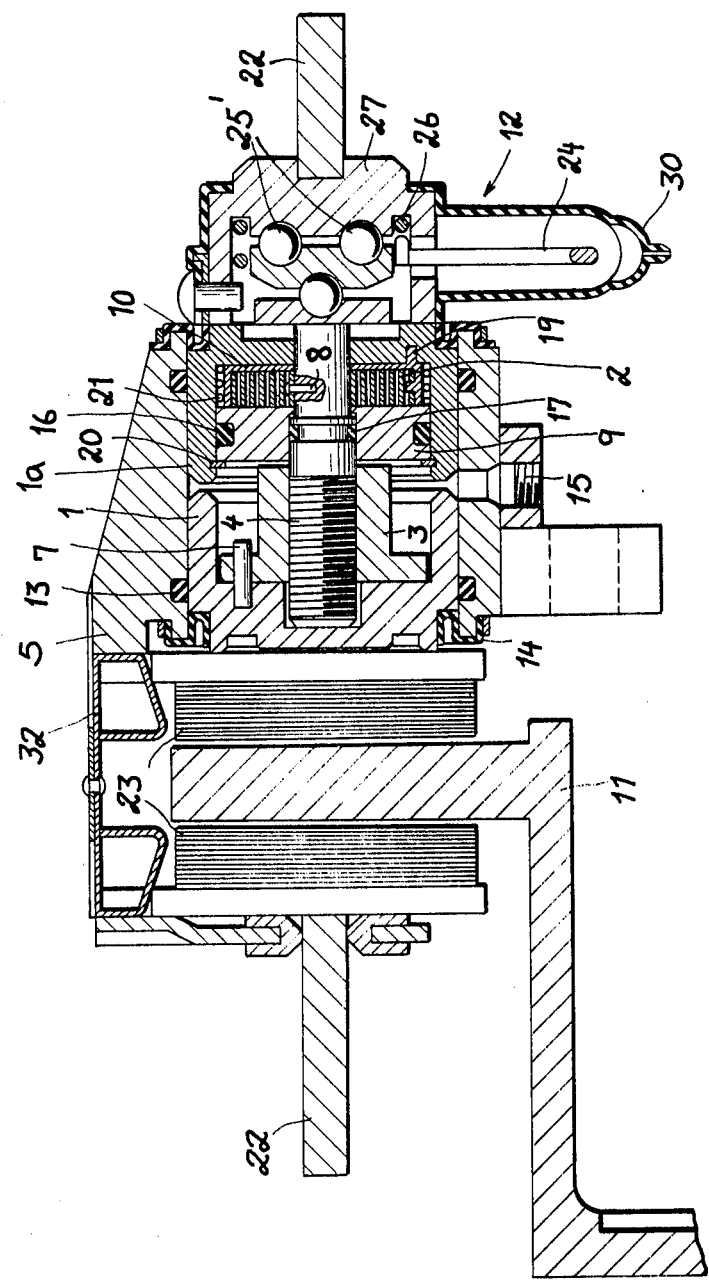

The above and other features, advantages, and objects of my invention will be described in the following with reference to the drawing in which:

FIG. 1 is a section through a disc brake provided with an adjustment mechanism according to my invention; and FIG. 2 is a section through a disc brake as in FIG. 1 here provided with a second embodiment of the adjustment mechanism in accordance with my invention.

FIGS. 1 and 2 show a disc brake similar to the one disclosed in FIG. 4 of the commonly assigned copending application Ser. No. 681,330 (now U.S. Pat. No. 3,490,565), filed on 8 Nov. 1967 by Marschall et al. Two brakeshoes 23 are engageable with a brake disc 11. The right-hand shoe 23 is shifted against the disc 11 by movement to the left of a piston 1 sealed by a cuff 14 and a roll-back seal 13 against a housing 5. The left-hand shoe 23 is moved against the disc 11 by action of a frame member 22 which can be moved by a piston 1a displaced to the right by the reaction force hydraulically created in the wheel-brake cylinder and sealed with a seal 33 and cuff 31 against the fixed housing 5 and its cylinder. In addition a mechanism 12 in turn actuated by the brakeshoe 23 can be actuated by a lever 24 rotated against the force of a torsion spring 26 on a bearing 25 to permit balls 25' to climb respective ramps, forcing members 27 and 28 apart as described in the commonly assigned copending application Ser. No. 704,790 (now U.S. Pat. No. 3,465,852) "Floating-yoke Disk Brake for Dual-Network Vehicle Brake System" filed 12 Feb. 1968 by Juan Belart. A rubber protector cap 30 protects the mechanism 12. A tire-carrying wheel disc is shown at 23'.

Between the pistons 1 and 1a is a sleeve 3 anchored to the piston 1 by a pin 7 and threadedly engaged by a threaded adjustment rod or spindle 4. This adjustment member 4 bears with its unthreaded end against the member 28 of the mechanical actuator so that rotation of the spindle will move the brakeshoes 23 together thereby adjusting the brake. Influx of brake fluid through a port 15 drives the two pistons 1 and 1a apart thereby bringing the shoes 23 into engagement with the disc 11.

Surrounding the member 4 is a spiral torsion spring 2 and a blocking piston 9. The spring 2 is connected securely (at its inner end) to the member 4 at 8 and is anchored securely to the piston 1a through a finger 19 of a cup 10 in which it is seated. Since the piston 1a is nonrotatable, the spring 2 can be wound up or "tensioned" when the brake is assembled to rotate the adjustment member 4 thereby pushing the piston 1 against the force of the roll-back seal 13 and advancing the rest position of the piston. Once the roll-back force of the seal 13 equals the force of the spring 2, the correct brake play is set and no more adjustment takes place. The roll-back seal 13 here acts as a return means for the piston 1.

In order to prevent this adjustment operation from taking place during actuation of the brake, the blocking piston 9 is movable to the right under hydraulic actuating pressure supplied to the wheel-brake cylinder to clamp the spring 2 and prevent any adjustment from taking place. The piston 9 is sealed against the member 4 by a seal 17 and against the piston 1a by a seal 16.

The piston 9 is biased away from the spring 2 in FIG. 1 by a disc spring 22' which bears against a shoulder of the member 4 and against a ring 6 snapped into the piston 9. Thus, slight spring pressure keeps the piston 9 from permanently blocking the spring 2.

In FIG. 2 a compression spring 21 urges the piston 9 away from the spring 2 and a snap ring 20 is provided in the piston 1a to keep the piston 9 from traveling too far.

My adjustment mechanism is equally usable with fixed-saddle disc brakes as shown, for example, in the commonly assigned copending application Ser. No. 731,153 entitled "-Bleeding Arrangement for a Dual-Network Hydraulic Brake system" filed on May 22 1968 by Becker and Kretzer (now U.S. Pat. No. 3,487,896 ). It can also be applied to a pivot-type disc brake as disclosed in the commonly assigned copending application, Ser. No. 754,086 entitled "Spot-type disc brake" filed by Hans Beller on or about Sept. 15 1968. Naturally, my invention may also be used in a drum brake. Indeed, this adjustment mechanism herein disclosed is usable with virtually any type of brake needing some sort of adjustment mechanism.

The brake system of FIG. 1 and FIG. 2 operates generally as described in application Ser. No. 681,330 mentioned earlier. When brake fluid is supplied from the master cylinder of the vehicle to the port 15, it enters the wheel-brake cylinder between the pistons 1 and 1a under pressure, thereby driving piston 1 to the left add applying its brakeshoe 23 directly to the brake disc 11 while stressing the roll-back seal 13. Simultaneously, the brake pressure is applied to piston 1a and drives it to the right, thereby applying force in this direction to the housing 27 of the mechanical actuator 12 and to the right-hand side of the frame 22. At the left-hand side of the brake, the frame 22 draws the other brakeshoe 23 against the disc. Since the hydraulic pressure in the wheel-brake cylinder also urges the blocking piston 9 to the right, the spring 2 is clamped against the bottom of piston 1a and cannot exert its torsion force or torque upon the spindle 4. When the hydraulic pressure is released (upon deenergization of the master cylinder), the pressure upon piston 1 to the left is reduced to allow the roll-back seal 13 to reestablish the original brake play and retain the piston 1 in its new rest position corresponding to the degree of wear of the brakeshoes. The force upon blocking piston 9 is also relieved and the torsion spring 2 is rendered effective to rotate the spindle 4 and thereby withdraw it from the bushing 3 to the extent necessary to compensate for such wear of the brakeshoes. Consequently, the frame 22, the housing 27 and the remote brakeshoe are repositioned in new rest positions corresponding to the degree of wear. There is, consequently, an advance of the adjustment mechanism only when hydraulic pressure is relieved and only to the extent necessary to compensate for brake wear. Accordingly, the adjustment mechanism is never advanced when the brake is under stress.

Similarly, the mechanism 12 can be used to manually actuate the brake by, for example, a displacement of the emergency or parking-brake lever located in the region of the driver's seat of the vehicle. This lever, which is coupled via a bowden cable with the lever 24, rotates member 29 to allow the balls 25' to ride up along their inclined ramps (see application Ser. No. 704,790 now U.S. Pat. No. 3,465,852) and spread members 27 and 28 in the axial direction. Member 27 acts upon the frame 22 to the right, thereby drawing the remote brakeshoe against the disc. Member 28 bears against the spindle 4 and drives the latter to the left to urge piston 1 in this direction and apply the proximal brakeshoe to the disc. Again, the roll-back seal 13 is stressed and, upon release of the emergency or parking brake lever, is relieved by shifting the piston 1 to reestablish the original brake play. During mechanical actuation of the brake, moreover, the spindle 4 is clamped by member 28 against piston 1 and cannot be rotated by the spring 2. Upon release of the mechanical actuator, self-adjustment occurs as previously described.

The improvement described and illustrated is believed to admit of many modifications within the ability of persons skilled in the art, all such modifications being considered within the spirit and scope of the invention except as limited by the appended claims.

I claim:

1. A wear-compensation adjustment mechanism for a hydraulic brake, said mechanism comprising:
   an adjustment member rotatable in one sense to adjust said brake;
   a spiral spring for rotating said member in said one sense; and
   hydraulically actuatable blocking means engageable with said spring for rendering same ineffective for rotating said member on hydraulic actuation of said brake, said brake being a disc brake having a housing forming a cylinder, a piston movable in said cylinder, and restoring means for reestablishing brake play upon hydraulic actuation of said piston, said adjustment member being a threaded spindle threadedly engaged with said piston for displacing same in one axial direction thereof to adjust said brake, said restoring means acting upon said piston in the other axial direction, said spiral spring being anchored at its inner end to said threaded spindle.

2. The mechanism defined in claim 1 wherein said return means is a roll-back seal received in said cylinder and surrounding said piston while frictionally engaging same.

3. A wear-compensation adjustment mechanism for a hydraulic brake, said mechanism comprising:
   an adjustment member rotatable in one sense to adjust said brake;
   a spiral spring for rotating said member in said one sense; and
   hydraulically actuable blocking means engageable with said spring for rendering same ineffective for rotating said member on hydraulic actuation of said brake;
   the mechanism defined in claim 2 wherein said blocking means being a second piston exposed to fluid pressure in said cylinder and engageable with said spiral spring to clamp it upon hydraulic pressurization of said cylinder.

4. The mechanism defined in claim 3, further comprising spring means urging said second piston away from said spiral spring.

5. The mechanism defined in claim 4 wherein said spring means is a dished-disc washer.

6. The mechanism defined in claim 4 wherein said spring means is a coil compression spring.

7. The mechanism defined in claim 6, further comprising an abutment in said cylinder, said second piston being engageable with said abutment under the force of said coil compression spring.

8. The mechanism defined in claim 3 wherein said second piston is annular and surrounds said spindle and, said spiral spring is substantially planar and surrounds said spindle while extending radially therebeyond into the path of said second piston.

9. The mechanism defined in claim 8 wherein said disc brake comprises further a brake disc rotatable relatively to said housing, a pair of brakeshoes flanking said disc on opposite sides thereof, said first piston bearing upon one of said brakeshoes proximal to said cylinder, a third piston axially shiftable in said cylinder and displaceable upon hydraulic pressurization thereof in a direction opposite the direction of displacement of said first piston by said hydraulic pressurization, and force-transmitting means between said third piston and the other of said brakeshoes for drawing same against said disc, said third piston being generally cup-shaped and opening in the direction of said first piston while slidably receiving said second piston and having a closed end turned away from said first piston, said spiral spring being disposed between said closed end and said second piston.

10. The mechanism defined in claim 9 wherein said spindle passes axially through said closed end of said third piston, said brake further comprising mechanical actuating means interposed between said force-transmitting means and said spindle for actuating said brake independently of hydraulic pressurization of said cylinder.